United States Patent [19]

Dunham

[11] Patent Number: 5,159,866
[45] Date of Patent: Nov. 3, 1992

[54] SAW GUIDE WITH SONIC REGULATED GAS LUBRICATION

[76] Inventor: James L. Dunham, 216 Redwood Ave., Willits, Calif. 95490

[21] Appl. No.: 772,114

[22] Filed: Oct. 7, 1991

Related U.S. Application Data

[63] Continuation-in-part of Ser. No. 500,399, Mar. 28, 1990, abandoned.

[51] Int. Cl.$^5$ .......................... B27B 5/29; F16C 13/06
[52] U.S. Cl. ........................................ 83/169; 83/824; 184/6.26; 184/55.1; 384/121; 384/124
[58] Field of Search ............... 83/169, 171, 824; 184/6.26, 55.1; 384/121, 124, 468

[56] References Cited

U.S. PATENT DOCUMENTS

| | | | |
|---|---|---|---|
| 3,623,520 | 11/1971 | Neild | 83/169 |
| 3,661,045 | 5/1972 | Mermelstein | 83/676 |
| 3,674,065 | 7/1972 | Fairfield, Jr. et al. | 83/169 X |
| 3,703,915 | 11/1972 | Pearson | 83/169 X |
| 3,720,290 | 3/1973 | Lansky et al. | 184/6.26 X |
| 3,750,503 | 8/1973 | McMillan | 83/16 |
| 3,918,334 | 11/1975 | Wilcox, deceased | 83/13 |
| 3,961,548 | 6/1976 | Claassen | 83/169 |
| 4,136,590 | 1/1979 | Kordyban et al. | 83/169 |
| 4,486,105 | 12/1984 | Miyake et al. | 384/121 X |
| 4,635,513 | 1/1987 | McGeeHee | 83/169 |
| 4,715,254 | 12/1987 | Degan | 83/169 |
| 4,848,200 | 7/1989 | McGeHee | 83/169 |
| 4,961,359 | 10/1990 | Dunham | 83/169 |

*Primary Examiner*—Frank T. Yost
*Assistant Examiner*—Raymond D. Woods

[57] ABSTRACT

A saw guide system having a high pressure gas lubricated bearing surface, an elastic bearing block support, a contoured bearing surface, and sonic regulated flow. The velocity of the gas gradually increases as it traverses the bearing surface. At the exterior edge of the bearing surface, where the gas exits, the velocity of the flow is Mach one, sonic velocity.

7 Claims, 5 Drawing Sheets

SAW GUIDE WITH SONIC REGULATED GAS LUBRICATION

This application is a continuation in part of application Ser. No. 07/500,399 filed Mar. 28, 1990, now abandoned.

BACKGROUND OF THE INVENTION

1. Field of the Invention

The present invention generally relates to saw guides for wood sawing with lubricating and cooling capabilities which include externally pressurized gas bearings.

2. Description of Prior Art

Multiple blade saw systems are widely used throughout the lumber industry. Most multiple blade saw systems use very thin circular saw blades. Thin saw blades use less power and provide higher yield. However, thin saw blades require saw guide systems to stabilize the blades during cutting and prevent buckling. Typically this is done by sandwiching each blade between two flat lubricated surfaces which act as bearings supporting the blade. These bearing surfaces usually consist of a low friction material supported by a metal block adjacent the cutting zone.

Saw guide systems normally include a means of lubricating and cooling both the saw guides and saw blades. Typically liquid lubricants are carried into the narrow space between saw guide and saw blade in the form of a mist created by forcing high pressure air through a venturi nozzle or the like. Other systems apply liquid lubricants and coolants directly into the space. Some systems are provided with dual sets of passages in each saw guide to provide both air-oil and air-water mists.

A problem with saw guide systems in general is the wear of bearing surfaces. Guides require frequent changing. Typically babbitt saw guides last only a few hundred hours.

Sawguides with gas bearings are not widely used in industry. However, the advantages of gas lubrication over liquid lubrication are well known. Due to the low viscosity of the gas lubricant, gas bearings have very low coefficients of friction. The stability of gas as lubricant allows gas bearings to operate in both high and low temperature environments where liquids would solidify, vaporize, cavitate, or decompose. Gas bearings operate with very small clearances and thus maintain close tolerances.

The disadvantages of gas bearings are also recognized. Prior art teaches that conventional gas bearings have a low unit load carrying capacity. Generally gas bearings are larger and operate with very thin films compared to their liquid lubricated counterparts. The thin films in gas bearings demand very close control of machining tolerances and surface finishes.

The unit load capacity of gas bearings is pressure dependant. High unit loads require high gas pressures. Gas bearings are often thought to be incapable of operating at unit loads achievable by liquid lubricated bearings. There are many analytical and experimental studies on the phenomena of supersonic pressure depression in the feeding region of externally pressurized gas bearings. The deductive conclusion of this teaching is that raising the inlet pressure on a particular gas bearing can have a negative effect on load capacity. However, in many such cases the internal shock surfaces arise primarily from the rapid expansion of the flow cross sectional area.

The supersonic gas bearing Miyake et al., U.S. Pat. No. 4,486,105, is based on a recognition of the advantage of deliberately varying the flow cross sectional area to regulate the character of the flow within the bearing clearance space. In this type of gas bearing the flow cross sectional area is varied along the flow path to form a smooth converging-diverging nozzle. Under the nominal design conditions, the flow enters the converging section at a subsonic velocity, gradually accelerates to sonic velocity at the at the end of the converging portion, and then continues to accelerate at supersonic velocities in the diverging section to the edge of the bearing. This type of bearing has a much higher unit load capacity than a conventional gas bearing. However, supersonic bearings typically consume large quantities of gas. This is due primarily to the relatively large clearance gap utilized to make the area change effects dominate relative to other effects, such as flow friction and heat transfer, and produce the smooth flow transitions from subsonic to supersonic velocities within the bearing clearance space.

Heretofore, prior art has failed to appreciate the advantages of controlling the character of the flow with cross sectional area control in conjunction with frictional effects within a gas bearing. It is possible to have both high pressure, low gas consumption, and subsonic flow by controlling flow cross sectional area in combination with significant friction. Specifically, it is not necessary have a region of supersonic flow, as in the supersonic bearing, to obtain high unit load capacity. Additionally, prior art does not appreciate the advantages of maintaining a Mach 1.0, or sonic exit conditions at the exterior edge of the bearing surface.

Prior art includes a number of considerations of compressible flow effects which are relevant to a specific application. These include air hammer instability and lock up which are sometimes related to each other. Lock up can occur when the gas supply pressure multiplied by the area of the recess is less than the load. Avoiding lock up is crucial in many situations such as opposed pad thrust bearings used in sawguides.

Heretofore, the closest prior art to present invention is Kordyban, U.S. Pat. No. 4,136,513, a floating pad saw guide. Air is used as the primary lubricant. However, the asymmetry in the design is indicative of an approach using low pressures and low velocities across the bearing surfaces relative to saw tip speed. The single small circular supply hole and a uniform clearance space gap preclude establishing a shock surface at the exterior edge of the bearing surface and a gradually increasing velocity along the flow path.

Gas bearings with small clearances are often limited by the expense of manufacturing surfaces of the required tolerances. The use of self aligning bearing surfaces can greatly reduce the necessity for expensive machining while providing close tolerances. However, the advantages of compliant support in controlling the response and cross sectional flow area of gas bearings are not appreciated by prior art.

SUMMARY OF THE INVENTION, OBJECTS, AND ADVANTAGES

The present invention provides a improved sawguide with an externally pressurized self aligning gas bearing having with high unit load capacity.

The present invention includes a bearing with sonic regulation. A sonic regulated flow is defined as a flow moving across a bearing surface such that at the exterior edge of the bearing surface the velocity of the flow is Mach 1.0—sonic velocity. Sonic regulated flows can have a standing shock at the edge of the bearing surface where the gas exits. Certain sonic regulated flows have the interesting property of a constant flow rate regardless of variations in pressure downstream of the exit. This is the case when the downstream pressure remains below the critical pressure, which for air is about 53 percent of the upstream pressure. Sonic regulation also includes the case where the downstream pressure is above the critical pressure. Sonic regulation is incorporated into the present invention by incorporating the combinations of pressurization, cross sectional flow area change, friction, and heat transfer, which maintain a velocity of Mach 1.0 along the exterior edge of the bearing surface. A velocity of Mach 1.0 is sonic velocity.

The various theoretical models used in simple compressible gas flow are useful in designing and understanding high load gas bearings. The three most important factors altering the state of a flow stream are changes in cross sectional flow area, wall friction, and the addition or removal of heat. Each effect has an associated simple theoretical model. Respectively they are simple area change, simple friction, and stagnation temperature change. For a compressible gas these flow models are also known respectively as isentropic flow, Fanno line flow, and Rayleigh line flow.

With respect to gas bearings the simple characteristics of these flow types can lead to great insight into how to optimize high pressure gas bearing design from a qualitative point of view.

Area change effects such as those which occur in converging and diverging nozzles are often the subject Isentropic gas flow analysis. Many elementary gas analysis deal with adiabatic supersonic and subsonic flows within nozzles. This type of analysis can lead to the recognition that in conventional gas bearings area change effects are often the cause of shock waves. Such shock waves, are generally deemed undesirable in conventional gas bearings. The supersonic gas bearing utilizes area change effects to achieve high unit load capacity. In the supersonic bearing the flow cross sectional area is gradually reduced accelerating the flow to sonic velocity at a predetermined position within the clearance space of the bearing and gradually increased to produce supersonic flow across the remaining bearing surface to edge of the bearing where there is a supersonic exit. It is not necessary to have a supersonic flow region in order to have a high unit load bearing. The present invention includes a high unit load bearing with a subsonic velocity within the bearing clearance space.

The small clearances within the gas bearing can result in length to equivalent diameter ratios on the order of a hundred or more making friction a significant factor. Prior art does not appreciate the advantages of specifically designing a bearing to be friction dominated. In such a bearing, a Fanno line flow gas bearing, the gas enters the constant cross sectional area clearance space at a subsonic velocity and exits at a higher velocity, typically Mach 1.0, under the nominal design conditions. Thus, the gas velocity gradually rises as the gas proceeds across the bearing surface. The entering mach number can be estimated by complicated but workable methods once it is known that the pressure supplied is sufficient to force a Mach 1.0 exit. Or conversely one can assume a Mach 1.0 exit and back calculate the entrance and exit conditions for a given entrance pressure.

A key parameter of the physical system is known in the literature as $4fL/d$ where $f$ is friction factor, $L$ is a length, and $d$ is the equivalent diameter of the flow path. For clearance space of thickness $h$, $d$ would often be taken as approximately two times $h$. FIG. 4 shows a plot of the flow path length across a bearing land area verses Mach number for a typical Fanno flow gas bearing with a mach 1.0 exit. FIG. 5 shows a plot of flow path length verses the stagnation pressure ratio, $PO/PO^*$, for a typical Fanno flow gas bearing with constant flow cross sectional area. Such procedures are well known in gas dynamics and are useful in designing Fanno flow bearings. Fanno flow gas bearings are able to operate at very high pressures and hence carry high unit loads.

Similarly, it can be appreciated the Rayleigh line flow models in combination with Fanno line flows are informative in understanding normal shock in constant area flows. In certain situations involving heat transfer, such as combustion, the Rayleigh line flow models can dominate. Often in gas bearings this effect is modest and can neglected. Qualitatively the effects of Rayleigh line flow are similar to Fanno flow in that within certain constant area sub sonic flows the addition of heat along the flow channel increases the velocity to a maximum of Mach one at the exit.

Another important consideration that establishes the lower limit on clearance space for gas bearings is the mean free path length which is a measure of the minimum characteristic distance required for a gas to behave as a continuum. The mean free path of air at typical supply pressures is less than a 0.000001 inch so that even at nominal clearances of 0.000001 inch the gas flows as a continuum. It is thus practical to operate fanno flow bearings with very small clearance space gaps at pressures of several hundred pounds per square inch or more.

Uniform cross sectional area and flow path lengths are important characteristics of a Fanno flow gas bearing. Supplying gas from a nozzle or small circular recess to a flat circular bearing surface is typical of prior art. This is an example of non uniform cross sectional area. The induced radial flow cross sectional area expansion produces flow patterns dominated by area changes. This precludes the establishment of a shock surface at the exterior edge of the bearing surface unless the recess is very large. A technique included in the present invention for maintaining control over the flow cross sectional area is to narrow the clearance space along the flow channel in a systematic way. For example in the above circular bearing surface with constant clearance the flow cross sectional area is proportional to the radius. If the gap across the clearance space between the opposed bearing surfaces is made to vary inversely with the radius instead of being constant then the flow cross sectional area would be a constant value and thus independent of the radius.

The present invention includes using various techniques to control cross sectional flow area by varying the clearance gap along the flow path. The conceptually simplest way to narrow the clearance gap along the flow path is to contour the bearing surface. Systematically contouring a rigid bearing surface usually requires great accuracy in dimensional control during manufacture and operation. However, the alignment requirements can be relaxed by supporting the bearing surface using a flexible or compliant base. The use of self aligning bearing surfaces make high pressure gas bearings commercially viable by reducing costs. Additionally there is another important consideration regarding compliant bearing surfaces for gas bearings. Bearing surfaces with compliant support can automatically induce cross sectional flow area control by varying the clearance space gap in response to load variations. For example, a preloaded elasticly supported bearing surface can automatically position itself. The stiffness of such a bearing is a combination of the stiffness of the support and the bearing gas dynamics. Generally, the stiffness of the support is much less than the gas bearing stiffness. This allows the bearing to be self adjusting both statically and dynamically. Such bearings are capable of supporting high unit loads and at the same time are responsive with regards to variations in the loading.

The present invention also includes various combinations of elastic support, bearing preloading, inlet pressurization, orifice passage flow regulation, bearing surface geometry, recesses, and exterior edge sonic regulation, all in conjunction with flow cross sectional area control.

The present invention provides an improved system and method for supporting, and lubricating circular saws in multiple saw assemblies. The system uses individual saw guides, each of which includes at least one bearing surface intended to be placed adjacent the flat face of a saw blade. Two such guides placed on opposite faces of saw blade together form a guide channel which supports and guides the rotating saw blade.

The present invention is based on providing a sawguide with externally pressurized gas bearing surfaces. The present invention has shallow recesses in the saw guide bearing surfaces which distribute the gas evenly to each bearing surface. The gas lubricants enter a recess through a precisely machined orifice passage at the center of the recess. With an adequate supply of high pressure gas the orifice passage regulates the flow by creating a flow dependant pressure loss in the orifice passage. Greater regulation results in a stiffer bearing.

The bearing surfaces of the present invention are nearly rectangular sections. Each section has a central recess which supplies gas to the bearing surface. The distance from the edge of the recess to the exterior edge of the bearing surface is nearly the same for all points on the edge of the bearing surface. Thus, a symmetrical flow pattern is maintained across the bearing surface. A relief channel is provided between two adjacent bearing surface sections which allows the gas to escape freely to the atmosphere from the edge of the bearing surface.

The clearance gap between the bearing surface and the supported saw blade is small, usually less than 0.001 of an inch, so that friction is a significant factor affecting the flow. In general the bearing surface will be supported on a flexible base—a layer of elastic material. This allows the bearing surface to adjust in response to pressure variations and be self aligning. Conceptually, the bearing surface is pre-loaded in the zero gap position to just below the nominal operating load, compressing the elastic support layer. Pressurization of the bearing recess would then cause the bearing surface to lift off the saw blade to the nominal clearance gap. This flexibility automatically maintains the required clearance gap for controlling the character of the flow in the clearance space between the bearing surface and the saw blade. The stiffness of the bearing can be tuned by varying the amount of pre-compression, the elastic properties of the base, and the gas pressure to the bearing. In actual operation the bearing is pressurized prior to pre-loading so as to avoid bearing surface contact with the saw blade.

The gas is usually filtered compressed air routed to the bearing surface through passages in the saw guide and the guide support system. The supply air is regulated to provide a pressure and a flow rate which will enable the bearing to function as a high pressure gas bearing with sonic regulation. The present invention supplies gas to the bearing surface from a recess near the interior edge of the bearing surface. The gas enters into the clearance space between the bearing surface and the saw blade at subsonic velocity. It gradually rises in velocity as it proceeds across the bearing surface reaching sonic velocity at the exterior edge of the bearing surface. The rise in velocity is due to the combination of controlled cross sectional flow area and friction. At the exterior edge of the bearing surface there is a usually a shock, a sudden drop in total pressure, as the gas exits the bearing surface.

The present invention incorporates sonic regulation, Fanno line flow, and cross sectional area control. It is constructed to utilize these effects to produce a sawguide with a high unit load gas bearing.

DESCRIPTION OF THE PREFERRED EMBODIMENT

Figure 1:
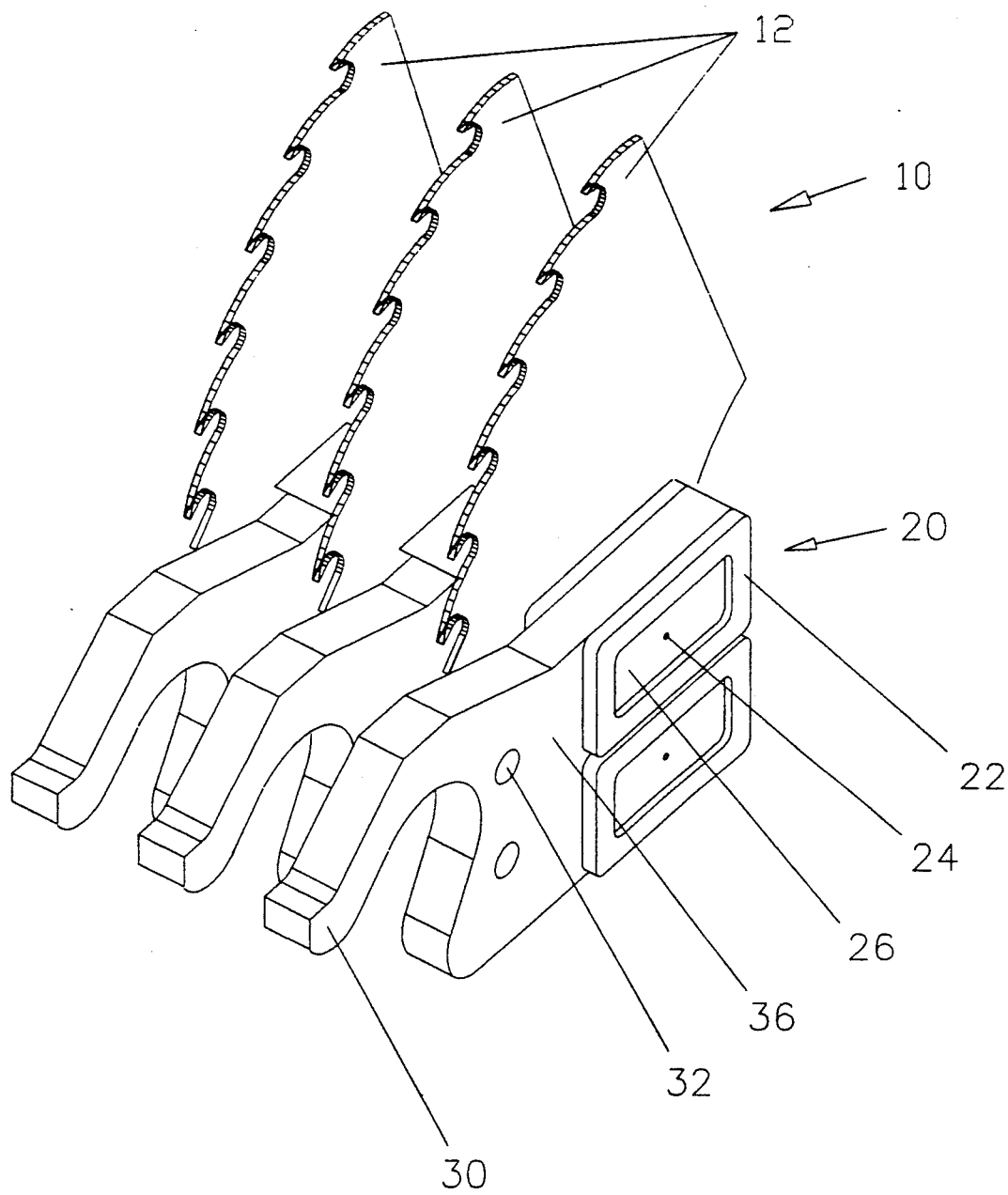
FIG. 1 is an isometric view of a multiple saw blade assembly which uses the present invention. The saw guides are spaced apart for clarity.

Referring to FIG. 1, a multiple circular saw assembly (10) includes several saw blades (12) which rest on a common arbor drive shaft (not shown). The blades (12) are driven in rotation by the arbor.

The saw blades (12) which are spaced apart axially on the drive shaft and are parallel to each other, make parallel cuts in the lumber being sawed. Individual saw guides (20) are located between the adjacent saw blades (12) with bearing surfaces (22) lying immediately adjacent the face of each saw blade (12). Typically the clearances between the saw guide (32) bearing surfaces (22) and the saw blade (12) will be 0.001 inch or less. The bearing surface (22) is usually made of a made of a hard material with a polished surface.

The saw guides (20) mount on a guide support rod (not shown) by a U-shaped bracket (30).

The present invention comprises an improvement to the system, specifically comprising a bearing surface (22) configured for gas lubricants and a means to deliver gas lubricants to the bearing surfaces (22).

Figure 2:
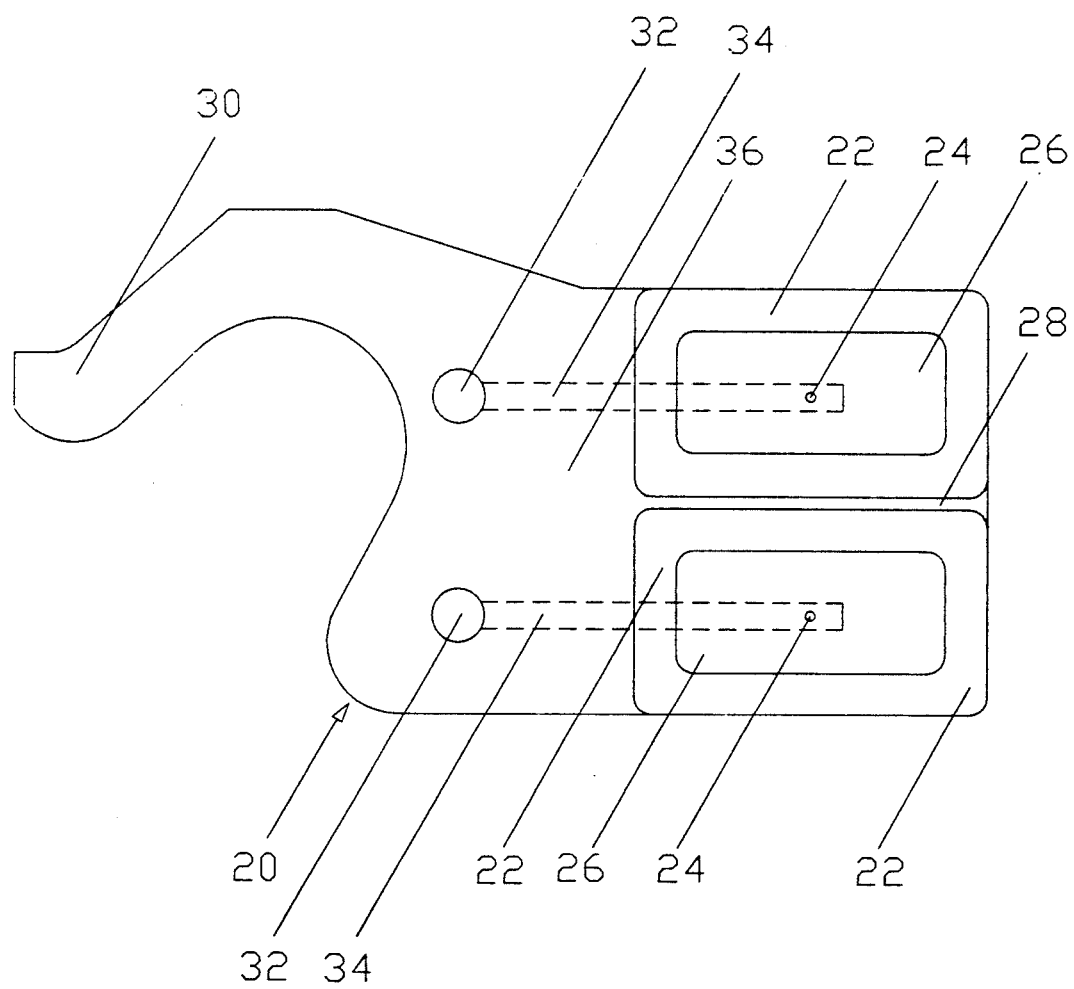
FIG. 2 is a front elevation view of the saw guide of the present invention with interior distribution passages indicated.
Figure 3:
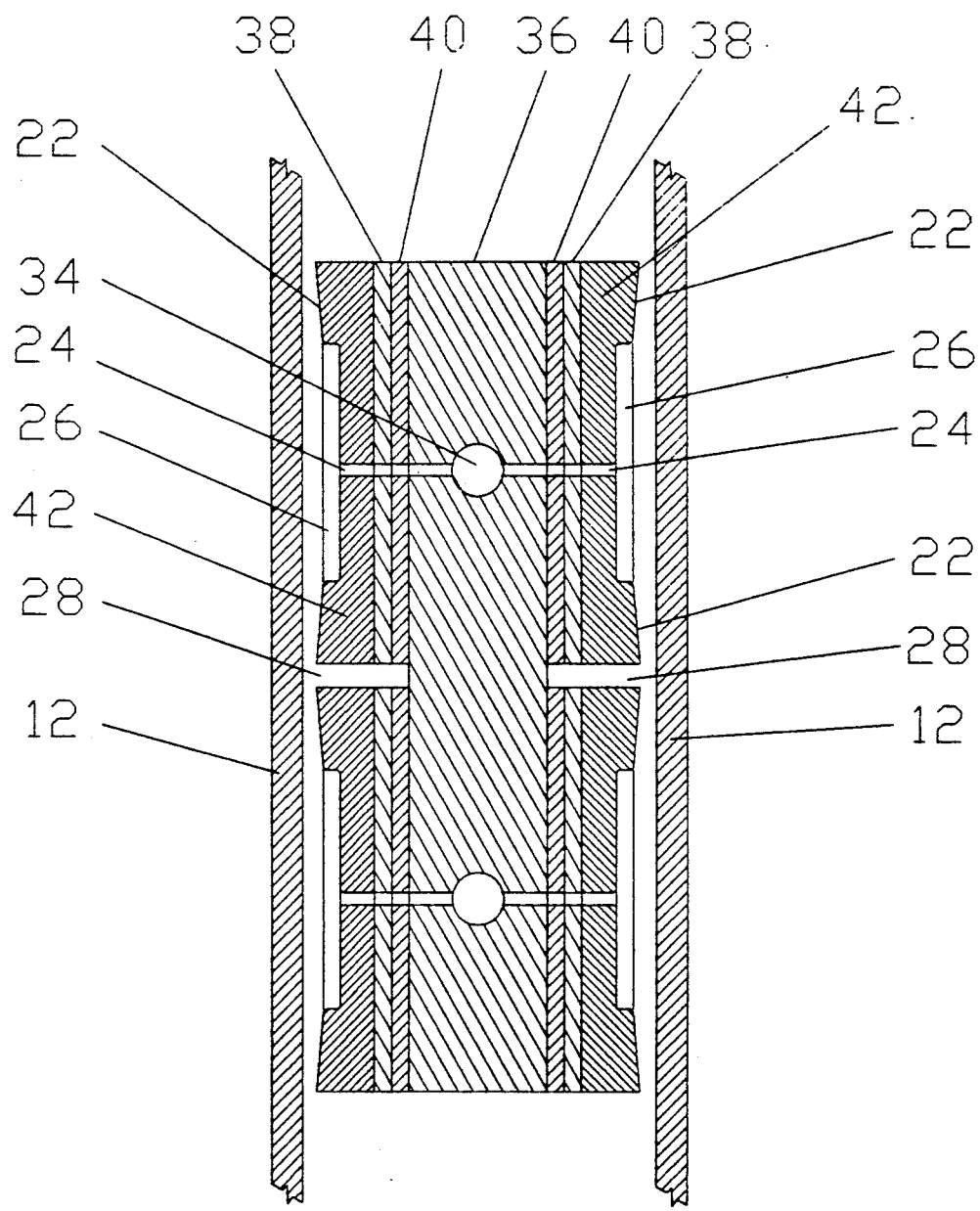
FIG. 3 is a sectional view of the saw guide of the present invention.
Figure 4:
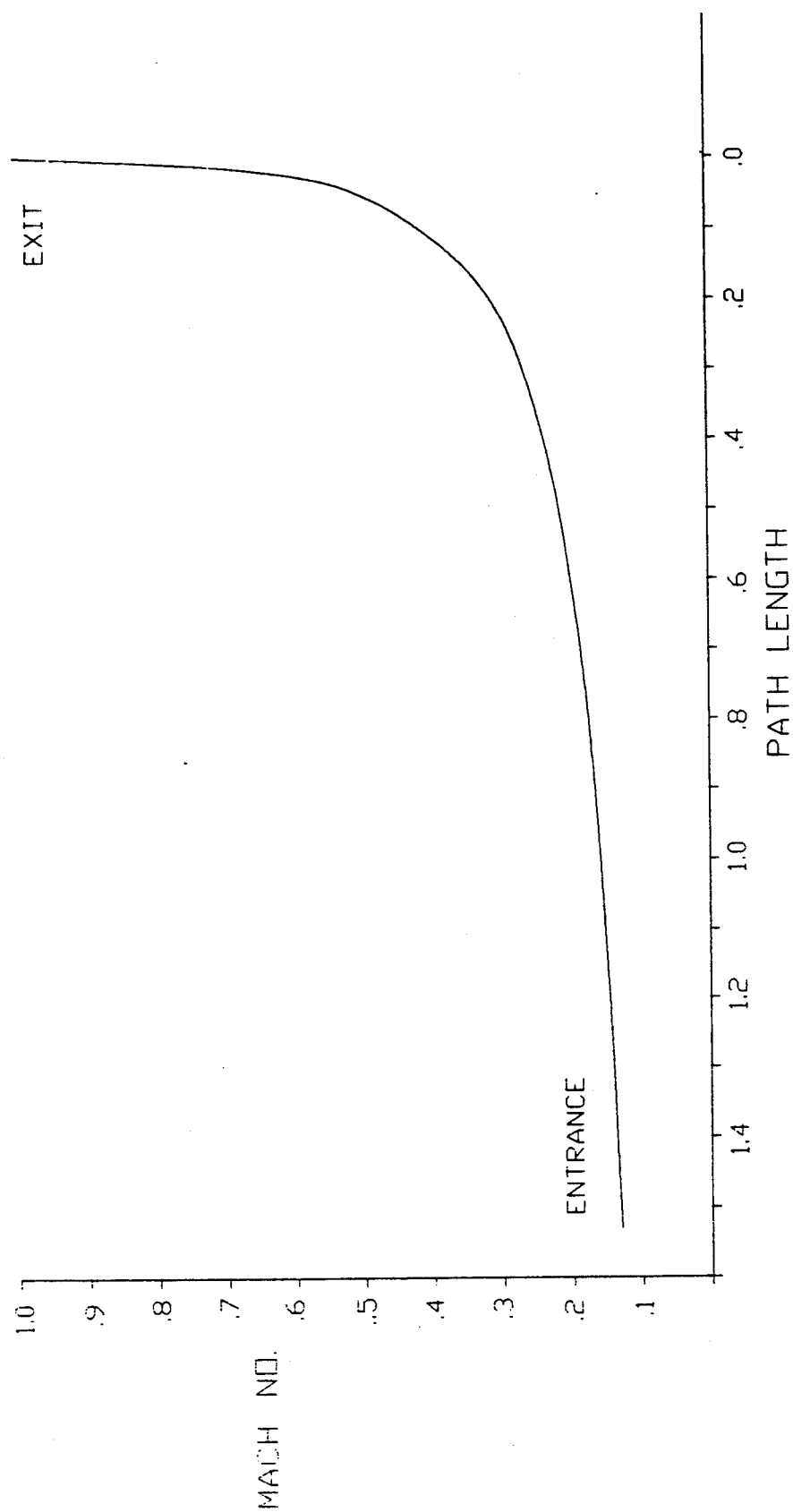
FIG. 4 is a plot of mach number verses flow path length for a constant area Fanno line flow.
Figure 5:
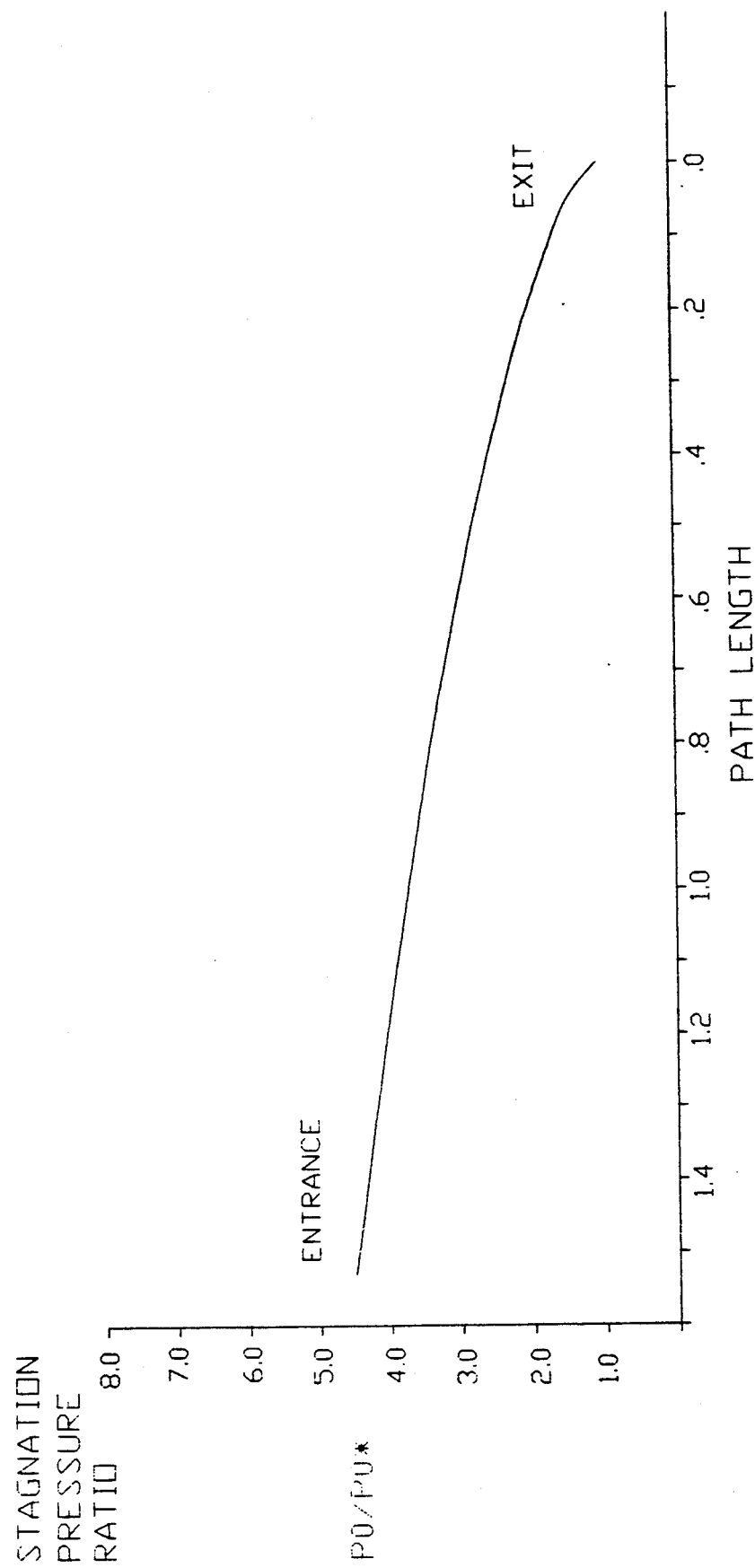
FIG. 5 is a plot of stagnation pressure (PO/PO*) verses flow path length for a constant area Fanno line flow.

Referring now to FIG. 2 and FIG. 3, each saw guide (20) has a structural support member (36), usually made of steel, machined to specified external dimensions. Raised bearing pad assemblies (42,38,40) are attached to the structural support member (36). The bearing pad assembly (42,38,40) consists of a bearing block (42), and elastic support layer (38) and a base plate (40). Bearing pad assemblies (42,38,40) are provided on both sides of the structural block (36) except for the end saw guides which have a saw blade on one side only. Various mechanical means, not shown, are used to attach the bearing pad assembly (42,40,38) base to the support member (36).

Adjacent bearing surfaces (22) are separated by a horizontal relief channel (28) comprising a means for gas escaping from the adjacent edges of the bearing surfaces (22) to vent freely to the atmosphere.

Each bearing block (42) has a raised contoured bearing surface (22) enclosing a central recess (26). There are a variety materials which are suitable as bearing block (42) including steel, hardened aluminum, glass, and plastics. Each recess is connected to the gas inlet port (32) by a series of certain internal passages (24,34) as will be described in detail below. The location, length and width of the recess (26), in conjunction with the approximately rectangular shape of the bearing surface (22) provides for an approximately equal distance between the edge of the recess (26) and the exterior edge of the bearing surface (22). This configuration ensures a relatively uniform flow path length across the bearing surface (22). Thus the pressurization of the recess (26) will result in a symmetrical and fairly uniform flow across the bearing surface from the recess (26) outward towards the edge of the bearing surface (22).

At the center of each recess (26) a precisely machined transverse passage (24) connects the bottom of each recess (26) to a longitudinal interior passage (34). The longitudinal interior passage (36) in turn connects to the transverse passage (32) which is the gas inlet port. The cross sectional area of the transverse passage (32) and the longitudinal passage (36) are in general much larger than the cross sectional area of the transverse passages (24) connecting to the recesses (26).

It will be appreciated that while the preferred embodiment of the present invention provides a separate network of passages for conveying gas to the separated bearing surfaces, the present invention may also include common distribution passages within the saw guide which can supply gases to the individual bearing surfaces.

Additionally, it will be appreciated that while the preferred embodiment of the present invention has two separate rectangular bearing surfaces per side, the present invention may also include one, three, or more such surfaces per side. Several other such combinations are obvious.

A source of pressurized gas, usually dry filtered compressed air, is connected to the inlet port (32) of the individual saw guides (20) by means not shown. It will be appreciated the while the preferred embodiment of the present invention incorporates dry air, the present invention may also include other gases, air-oil mists, or air-water mists.

Additionally, the present invention also includes separate systems of passages which also may carry different gas mixtures or the same gas mixtures at different pressures to the individual bearing surfaces.

In operation, the port (32) is pressurized prior to pre-loading the bearing surface (22) and compressing the elastic support layer (38). The amount of compression is usually several thousandths of an inch, although this varies greatly with the thickness of the elastic support layer (38), the operating pressure, and the elasticity of the materials. In general the amount of unit preload on the bearing surfaces (22) is less than the operating pressure. During operation the bearing surface (22) is a small distance away from the saw blade (12) separated by a gas filled clearance gap from the saw blade (12).

During operation high pressure gas flows to the inlet ports (32) of the individual saw guides (20) and then through the internal passages (34) to the orifice passages (24) and then to the adjacent recess (26) in the bearing surfaces (22). There is small amount of pressure, typically less than a fifteen psig reduction, dissipated in transferring the gases to just upstream of the orifice passage. The pressure drop through the orifice passage is usually less than half the remaining pressure. The pressure loss across the bearing surface (22) induced by flow friction and cross sectional area change in the narrow space, typically a 0.001 inch or less gap, between the saw blade (12) and the bearing surface (22) will reduce the pressure to several psig average at the edge of the bearing surface. There will be a standing shock at the edge of the bearing surface where the gas exits dropping the pressure to atmospheric. The gas enters the narrow clearance space at subsonic velocity. It gradually increases in velocity as it flows across the bearing surface (22) rising to a velocity of Mach 1.0, sonic velocity, at the exterior edge of the bearing surface (22). The bearing surface (22) is contoured so as to continuously narrow the clearance gap along the flow path between the bearing surface (22) and the saw blade (12). This controls the cross sectional area of the flow path and in combination with friction induces the Fanno line dominated flow within the clearance space, allowing high pressures.

The important aspects of the proper operation include a substantial pressure drop across the orifice passage (24) and at the exterior edge of the bearing surface (22) so as to regulate flow. Regulation increases the magnitude of the bearing restoring force gradient which acts to hold the saw blade (12) in position by causing the pressure in the recess (24) to vary substantially with a change in the magnitude of the clearance between the bearing surface (22) and the saw blade (12).

Quick response time of restoring forces is characteristic of a dynamically stable system. High speed gas velocities flow result in rapid flow pattern adjustments in response to a change in saw blade position. With saw tip speeds on the order of 10,000 feet per minute then gas bearing velocities five times faster would be on the order of 50,000 ft per minute which is in upper sub sonic range of compressible air flow at room temperatures.

Additionally, the physical geometry, contour of the rectangular bearing surface, and the recess geometry comprise a means of regulating the expansion of the gases. This is important in order to maintain subsonic flow across the bearing surface rising to sonic at the edge under the nominal design conditions. In practical terms this also means using contoured bearing surfaces and large recesses.

The brief physical explanation given above is believed to be accurate. However, it should not be construed as binding or complete as the physics of compressible flow with dynamic boundaries is quite complex.

Although the foregoing invention has been described in some detail with illustrations and examples for clarity, it will be obvious that certain changes and modifications may be practiced within the scope of the appended claims.

What is claimed is:

1. An improved saw guide system for use in supporting saw assemblies which includes at least one saw guide adjacent each side of at least one saw blade, the improvement being that said saw guide comprises at least one gas lubricated bearing block having a raised contoured bearing surface enclosing a central recess, said recess provided with pressurized gas from an external source, said contoured bearing surface comprising a means to gradually narrow a clearance gap between said bearing surface and said adjacent saw blade along a gas flow path across said bearing surface, which produces sonic regulated gas flow across said bearing surface between said bearing surface and said saw blade.

2. An improved saw guide system as in claim 1 including a means integral to each saw guide for directing said pressurized gas to said recess, including a network of internal passages connected to a source of said pressurized gas, said network including a narrow orifice passage which comprises a means to regulate said gas flow to said recess.

3. An improved saw guide system as in claim 1 including at least two adjacent bearing pads on said saw guide separated by a channel comprising a means to convey gases escaping said bearing surfaces freely to the atmosphere.

4. An improved saw guide system as in claim 2 characterized by at least two of said networks of internal passages comprising a means of conveying gases independently to at least two of said recesses.

5. An improved saw guide system as in claim 1 wherein at least one of said bearing blocks is supported by an elastic layer.

6. An improved saw guide system for use in supporting saw assemblies which includes at least one saw guide adjacent each side of at least one saw blade, the improvement being that said saw guide is comprised of a self aligning gas bearing block having a gas bearing surface, means which produce sonic regulated gas flow across said bearing surface between said bearing surface and said saw guide, an elastic support layer, and a base plate, said elastic support layer sandwiched between said bearing block and said base plate, said elastic support layer comprising a compliant support means of said bearing block.

7. An improved saw guide system for use in supporting saw assemblies which includes at least one saw guide adjacent each side of at least one saw blade, the improvement being that said saw guide is comprised of a gas lubricated bearing block having a gas bearing surface, and means which produce sonic regulated gas flow across said bearing surface between said bearing surface and said saw blade.

* * * * *